May 31, 1932.  A. CHMIELEWSKI  1,861,300
AEROPLANE PARACHUTE
Filed April 10, 1931  2 Sheets-Sheet 1

Inventor
Anton Chmielewski.
By
Bryant & Lowry
Attorneys

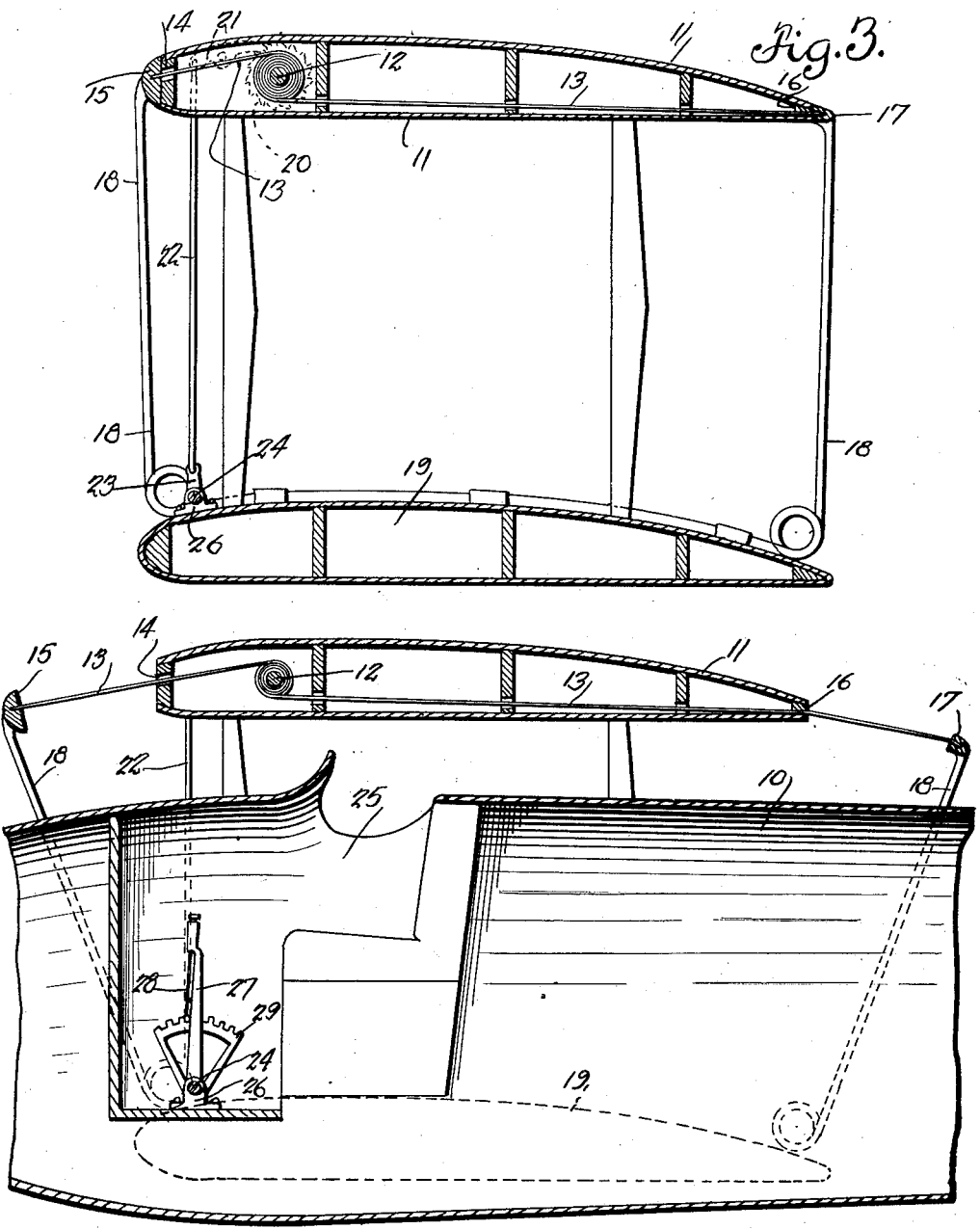

Patented May 31, 1932

1,861,300

UNITED STATES PATENT OFFICE

ANTON CHMIELEWSKI, OF IRON RIVER, MICHIGAN

AEROPLANE PARACHUTE

Application filed April 10, 1931. Serial No. 529,229.

This invention relates to aeroplanes and has special reference to an aeroplane parachute.

One important object of the invention is to provide an improved general construction of combined aeroplane and parachute therefor.

A second important object of the invention is to provide an improved arrangement of parachute for this purpose which is normally housed within the wings of an aeroplane.

A third important object of the invention is to provide novel means for withdrawing the parachute mechanically from the wings of the aeroplane.

A fourth important object of the invention is to provide novel means for supporting the parachute within the aeroplane wings.

With the above and other objects in view, the invention consists in general of certain novel details of construction and combinations of parts hereinafter more fully described, illustrated in the accompanying drawings and specifically claimed.

In the drawings:—

Figure 3 is an enlarged section on the line 3—3 of Figure 2;

Figure 4 is an enlarged section on the line 4—4 of Figure 2.

Figures 1, 2:
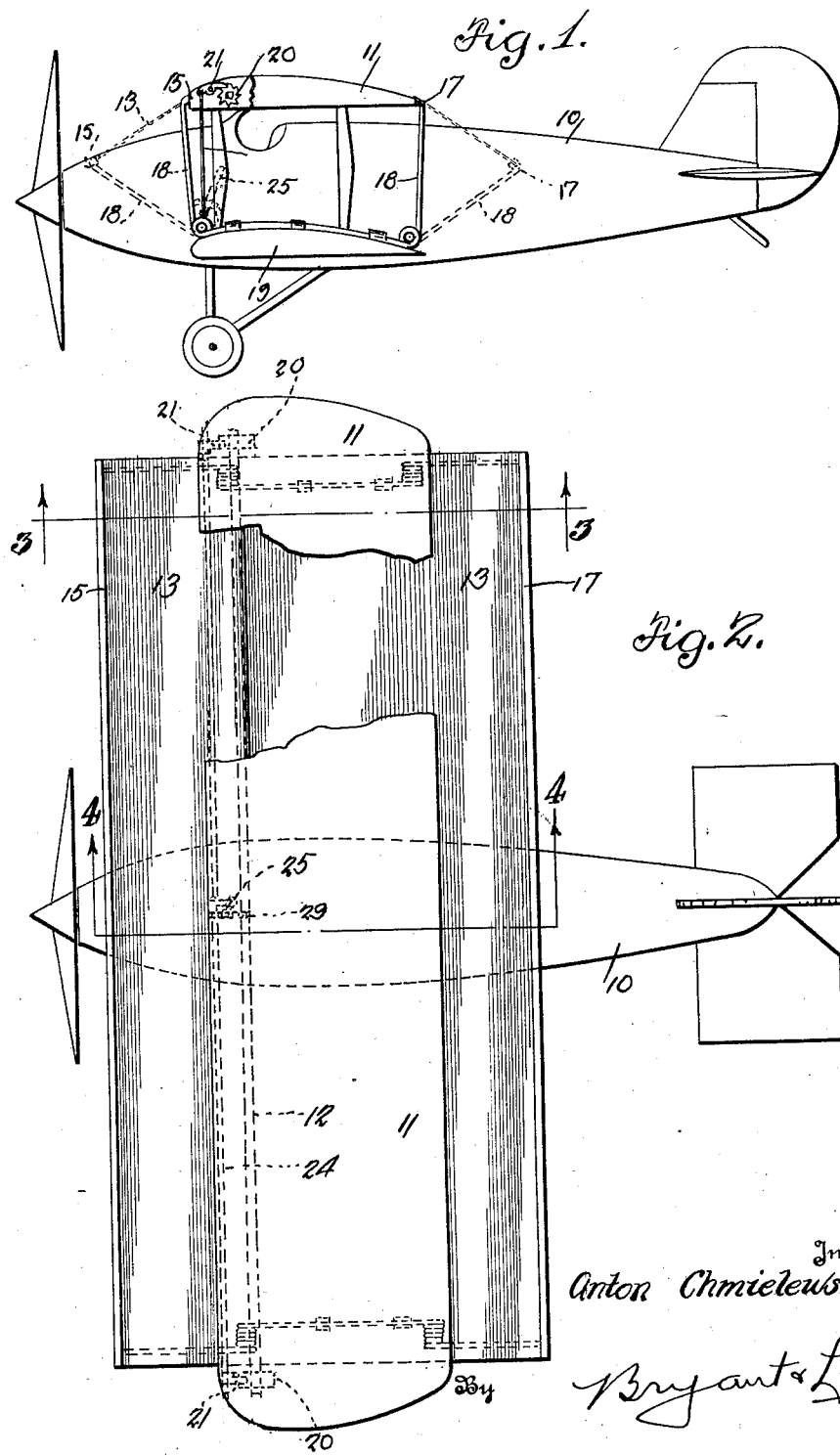
Figure 1 is a side elevation of an aeroplane equipped with the invention.
Figure 2 is a plan view thereof with the upper wing partly broken away to show the interior construction.

As here shown there is disclosed an aeroplane 10 of ordinary construction and which is provided with an upper wing 11 spaced above the top of the usual fuselage and extending continuously thereacross.

In each end of this upper wing is a suitable bearing wherein is supported a shaft 12 which extends through the wing from side to side thereof and which projects outwardly from the wing tips. Two parachute webs 13 are secured each by one edge to this shaft or roller and are wound thereon by rotating the roller so that these webs form alternate layers on the roller when not in use. One of these webs extends forwardly through a slot 14 in the leading edge of the wing and is secured to a strip 15 normally resting against and forming a fairing for the leading edge. Similarly, the other web leads rearwardly from the roller, passes out of a slot 16 in the trailing edge of the wing and is fixed to a strip 17 forming a fairing for this trailing edge. Each of the strips 15 and 17 has its ends supported by spring arms 18 carried by the lower wing 19 and so arranged that they tend constantly to draw the webs out of the wing to assume the position shown in dotted lines in Figure 1.

In order to hold the webs normally housed and to prevent action of the arms 18 there is provided on each projecting end of the shaft 12 a ratchet wheel 20 which is normally engaged by a pawl 21 pivoted intermediate its ends to the wing tip. Each of the pawls has a forwardly extending arm which is connected by a cord or wire 22 with a rock arm 23 carried on a rock shaft 24 extending over the lower wings and through the cockpit 25, this rock shaft being supported in bearings 26 fixed on said lower wings and to the floor of the cockpit. On this rock shaft is an operating lever 27 carrying a latch 28 working over a toothed quadrant 29, these parts being located in the cockpit so that the pilot may have control thereof.

As before stated, the webs are normally wound on the shaft 12. When occasion arises to use the parachute the pilot simply operates the latch lever to rotate the rock shaft. This causes the pawls to be freed from the ratchet wheels whereupon the spring arms draw the webs outwardly and downward to form, with the upper wing, a tent like arrangement which acts effectually to support the aeroplane so that it can only fall slowly and so that it is kept in substantially horizontal position. Thus, the aeroplane drops in such manner as to come to rest on the ground in a safe position and gently enough to prevent damage to the aeroplane and those in it.

There has thus been provided a simple and efficient device of the kind described and for the purpose specified.

It is obvious that changes may be made in the form and construction of the invention without departing from the principles thereof. It is not, therefore, desired to confine the invention to the exact form herein shown and described, but it is desired to include all such as come within the scope claimed.

I claim:—

1. The combination with an aeroplane having a wing comprising spaced walls and a covering for the walls; of a shaft extending through the wing transversely of the aeroplane, a pair of parachute webs wound on the shaft and normally housed entirely within the wings between the walls, and mechanism attached to the free edges of the webs to withdraw the webs from the wing.

2. The combination with an aeroplane having a wing comprising spaced walls and a covering for the walls; of a shaft extending through the wing transversely of the aeroplane, a pair of parachute webs wound on the shaft and normally housed entirely within the wing between the walls, and mechanism attached to the free edges of the webs to withdraw the webs from the wing, said mechanism being arranged to support the withdrawn webs in downwardly inclined planes from the leading and trailing edges of the wing.

3. The combination with an aeroplane having a wing comprising spaced walls and a covering for the walls; of a shaft extending through the wing transversely of the aeroplane, a pair of parachute webs wound on the shaft and normally housed entirely within the wing between the walls, mechanism attached to the free edges of the webs to withdraw the webs from the wing, and latch means under control of the pilot for restraining said mechanism from operation.

4. The combination with an aeroplane having a wing comprising spaced walls and a covering for the walls; of a shaft extending through the wing transversely of the aeroplane, a pair of parachute webs wound on the shaft and normally housed entirely within the wing between the walls, mechanism attached to the free edges of the webs to withdraw the webs from the wing, said mechanism being arranged to support the withdrawn webs in downwardly inclined planes from the leading and trailing edges of the wing, and latch means under control of the pilot for restraining said mechanism from operation.

5. The combination with an aeroplane having a wing; of a shaft extending through the wing transversely of the aeroplane, a pair of parachute webs wound on the shaft and normally housed entirely within the wing, said wing having slots in its leading and trailing edges for the withdrawal of said webs, fairing strips for said leading and trailing edges and having the free edges of the webs attached thereto, spring arms supporting said fairing strips and urging them away from the wing in downwardly inclined directions, and latch means for preventing unwinding of the webs from the shaft.

6. The combination with an aeroplane having a wing; of a shaft extending through the wing transversely of the aeroplane, a pair of parachute webs wound on the shaft and normally housed entirely within the wing, said wing having slots in its leading and trailing edges for the withdrawal of said webs, fairing strips for said leading and trailing edges and having the free edges of the webs attached thereto, spring arms supporting said fairing strips and urging them away from the wing in downwardly inclined directions, said latch means for preventing unwinding of the webs from the shaft, and including a ratchet on said shaft, a pawl normally engaging the ratchet, and means under control of the pilot for releasing said pawl.

In testimony whereof I affix my signature.

ANTON CHMIELEWSKI.